UNITED STATES PATENT OFFICE.

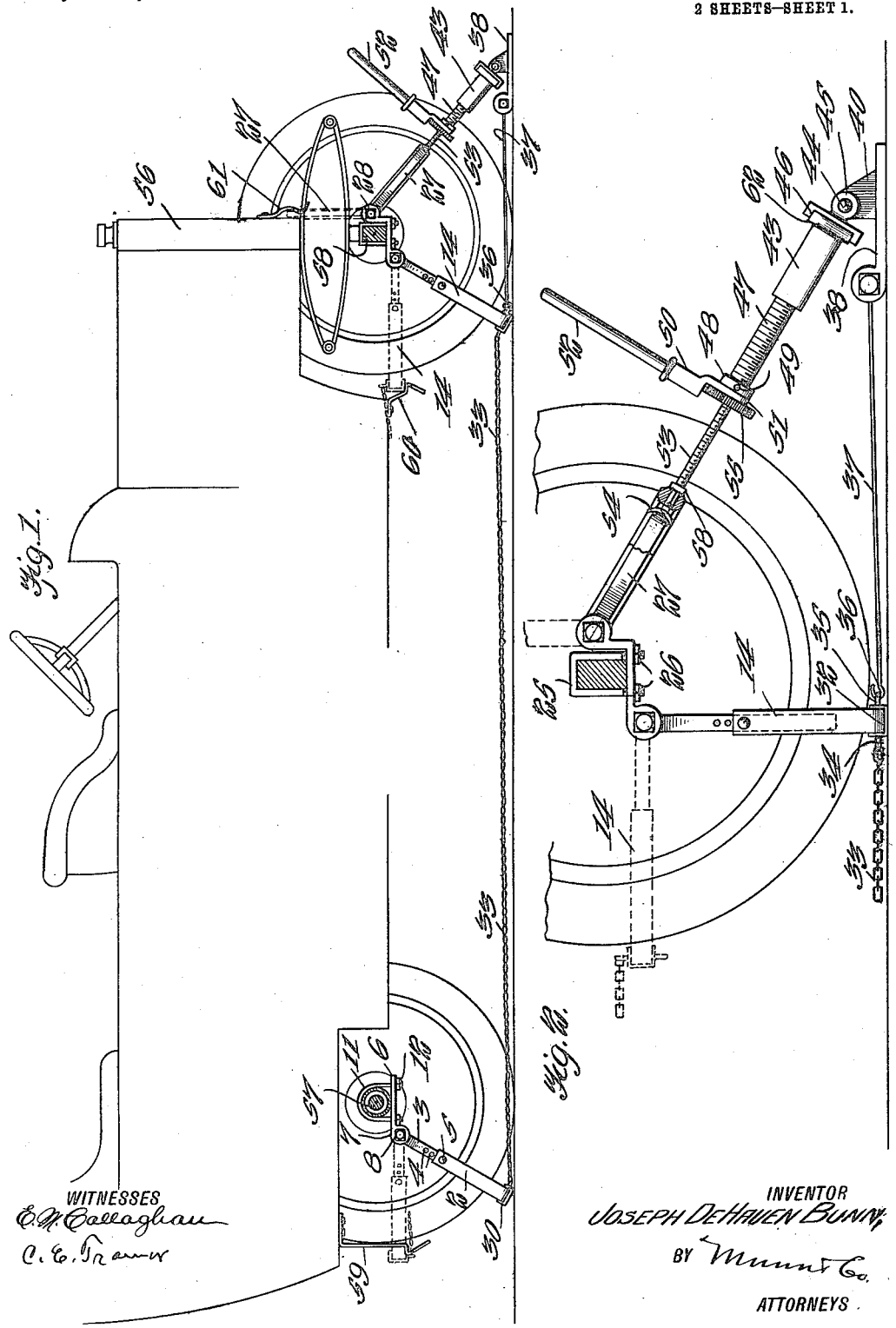

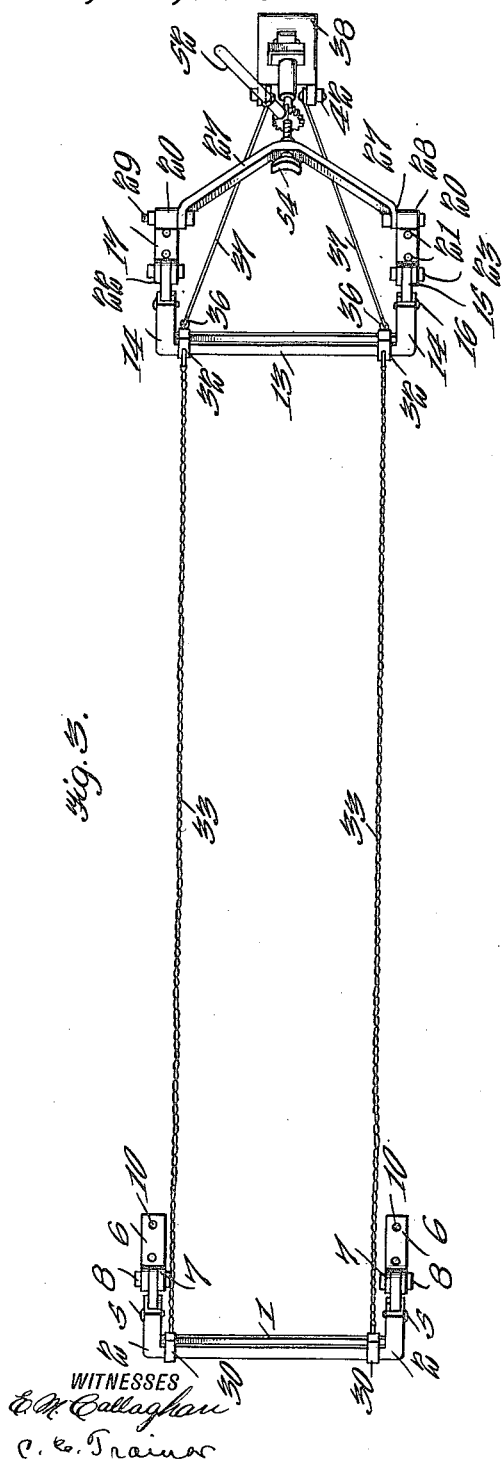

JOSEPH DE HAVEN BUNN, OF YORK, PENNSYLVANIA, ASSIGNOR OF ONE-HALF TO PHILIP RANKIN KOONS, OF MECHANICSBURG, PENNSYLVANIA, AND ONE-HALF TO ANNIE BUNN AND MAIA ATLEE BUNN, BOTH OF PHILADELPHIA, PENNSYLVANIA.

AUTOMOBILE-JACK.

1,081,013.  Specification of Letters Patent.  Patented Dec. 9, 1913.

Application filed November 14, 1912. Serial No. 731,371.

*To all whom it may concern:*

Be it known that I, JOSEPH DE HAVEN BUNN, a citizen of the United States, and a resident of York, in the county of York and State of Pennsylvania, have invented a new and useful Improvement in Automobile-Jacks, of which the following is a specification.

My invention is an improvement in automobile jacks and has for its object the provision of a simple, easily operated, inexpensive device of the character specified, by means of which an automobile or like vehicle may be lifted clear of the ground or other supporting surface and held in such position as long as may be necessary, and wherein the device is capable of adjustment for different heights.

In the drawings:—Figure 1 is a side view of the improvement in place beneath an automobile and in position for raising the same, the automobile being in section, Fig. 2 is a similar enlarged view of a portion of the device showing the automobile raised, Fig. 3 is a plan view of the improved jack, Fig. 4 is a perspective view of a portion of one of the rear supports, Fig. 5 is a perspective view of a portion of the front support, and Fig. 6 is a similar view of the base or support for the jack.

The present embodiment of the invention comprises a front and a rear support, each of the said supports being of channel form, and comprising a cross bar or base 1, and arms 2 arranged at a right angle to the base or the body and integral therewith.

A bar 3 is slidable in the channel of each of the arms and each bar is provided with a longitudinal series of openings 4, one of which is designed to register with an opening in the arm 2, and a pin 5 is provided for engaging the opening to hold the bar in adjusted position with respect to the arm.

Each of the arms 2 and the adjacent bar 3 forms a telescoping or extensible and contractible arm, and a rear axle support is connected with the upper end of each of the bars 3. Each of the said supports is in the form of a plate 6, having spaced ears 7, each ear being perforated to register with a perforation in the upper end of the bar 3, and a bolt 8 is passed through the registering openings and is engaged by a nut 9 for holding the bolt in place.

Each of the plates 6 is provided with longitudinally spaced openings 10 for engagement by the threaded ends of a U-shaped clip 11, the said clip being adapted to engage over the rear axle with the axle between the clip and the plate 6, and nuts 12 are threaded on to the arms below the plate for holding the clip to the plate.

The front support is similar to the rear support so far as the base is concerned, the said base consisting of a cross bar or portion 13 and arms 14 of channel shape and bars 15 are mounted to slide in the channels of the arms, each bar corresponding in all respects to the bar 3 before mentioned and being held in adjusted position by a bolt 16. The front axle support is in the form of an angle plate, consisting of two portions 17 and 18 arranged at a right angle with respect to each other, one of the said portions 17 having spaced ears 19, while the other portion 18 is provided with a transverse bearing 20, and the portion 17 is provided with spaced openings 21. The ears 19 are perforated as shown at 22, and the ears 19 engage opposite sides of the upper end of the bar 15, and are pivoted to the bar by means of a bolt 23.

Nuts 24 are engaged with the bolts, the said bolts and nuts pivotally connecting the angle plates 17—18 to the bar 15. A clip 25 of approximately U-shape is adapted to be passed over the front axle, and the threaded arms of the clip are passed through the openings 21 of the portion 17 of the angle plate and are engaged by nuts 26 below the said portion.

An approximately V-shaped bracket 27 is connected with the portion 18 of each of the angle plates, the ends of the said bracket being bent angularly to fit against the inner ends of the bearing 20 as shown at 28 in Fig. 3, and a shaft or rod 29 is passed through the alined bearing and through openings in the lugs 28, the said shaft or rod extending between the angle plates. Clips 30 are secured to the base portion of the rear support, by means of bolts or rivets 31, and similar clips 32 are secured to the cross bar 13 of the front support in like manner.

Chains 33 or other suitable flexible conductors connect the adjacent clips of the supports, each chain being connected with the clip 30 of the cross bar 1 of the rear support and extending forwardly to a connection with an eye 34 of each adjacent clip 32 of the cross bar of the front support. Each of the clips 32 is provided with an eye 35 at the front of the cross bar, and a hook 36 of a rod 37 is engaged with each of the said eyes, the rods 37 extending forwardly and inwardly to a connection with the base of the lifting jack, to be described. The said base is in the form of a plate 38, having at its front end laterally spaced perforated ears 39 and having on its upper face an upwardly extending lug 40, the said lug being provided with a transverse opening 41. The front ends of the rods 37 extend rearwardly alongside the face of the adjacent lug 39, and a bolt and nut 42 connects each of the said rods with the adjacent lug, each of the bolts passing through a ring or the like on the end of the rod and through the opening of the lug.

A jack is arranged between the base 38 and the bracket 27, the outer member or socket 43 of the jack being pivoted to the lug, by means of a bolt 44, which passes through spaced ears 45 on the base 46 of the jack. The standard 47 of the jack is threaded into the socket, and a collar 48 is secured to the upper end of the standard, by means of a pin 49. The operating arm 50 of the jack is provided with a bearing lug 51, encircling the standard above the collar, the said arm having a socket for receiving a lever 52 for turning the arm to rotate the standard. The standard 47 is hollow and internally threaded and a rod 53 is threaded into the hollow. The upper end of the rod 53 passes through an opening in the body of the bracket 27, and a wing nut 54 is engaged with the upper end of the rod above the body of the bracket. A gear wheel 55 is arranged on the rod 52, and the arm 50 is provided with a pawl for coöperating with the said wheel. It will be understood that any desired form of jack may be used, the said jack being arranged between the bracket 27 and the lug 40 of the jack base 38.

In operation, the device is arranged beneath the car 56 as shown in Fig. 1, each of the supports being arranged with its cross bar or base in rear of the adjacent axle and below the same, the arms 2 and 14 of the supports being inclined upwardly and forwardly. The bars 3 and 15 are then adjusted until the plate 6 and the portion 17 of the angle plates 17—18 rest against the lower face of the adjacent axle. The clips 11 or 25 as the case may be, are then engaged with the plates of the support. The clips 11 engage the rear axle 57, while the clips 25 engage the front axle. When in this position, the lever 52 is operated to extend the jack, and the car will be pushed rearwardly and lifted, swinging upward on the telescoping arms of the supports as shown in Fig. 2. When the said telescoping arms are vertical, the action of the jack is stopped, and the car may be held in this position as long as may be desired.

It will be noted from an inspection of Fig. 2, that the rod 35 has the end adjacent to the wing nut 54 polygonal in cross section, and that a shoulder 58 is provided, the said shoulder bearing against the body of the bracket 27. When not in use, the jack is disengaged from the bracket 27 by removing the nut 54 after which the rod 53 may be withdrawn. The bracket 27 is then swung up into the dotted line position of Figs. 1 and 2, and the front and rear supports are lifted as also shown in the said figures in dotted lines. The rear support is engaged with the resilient catch 59 on the body, the said catch holding the support in inoperative position. The front support is engaged with a similar catch 60. The device is thus always in position for use and may at any time be dropped in the full line position of Fig. 1. The jack, the support for the jack, and the rods 37 may be carried in the tool box or in any other desired place when not in use and the bracket 27 is held in the dotted line position of Fig. 1 on a catch 61.

It will be also noted that the body or socket 43 of the jack is not pivoted directly to the lug 40. The base 62 of the socket rests in a channel plate 63, which carries the lugs 45 pivoted to the lug 40. The jack may be thus used as a single jack for lifting one of the wheels or any other purpose that a jack may be used. When intended to be used with the lifting device, the base of the jack is merely inserted in the channel of the plate 63 and it is ready for use.

It will be seen that the improved device is always in position for use, being connected with the axles at all times. On this account, and because of the fact that it may be used with an ordinary jack, the device may be brought into operation at any time whether on the road or at home.

I claim:—

1. A device of the character specified, comprising front and rear axle supports, each of the said supports consisting of a body adapted to be arranged below the axle in rear thereof and approximately parallel therewith and upwardly extending telescoping arms, means for securing each arm in adjusted position, an axle plate pivoted to the upper end of each of the said arms, a clip for each plate fitting over the plate and detachably connected with the plate, flexible connections between the bodies of the support, a jack support, a rigid connection between the body of the front support and the jack support, a jack comprising a fixed and a movable member, the fixed member being pivoted to the jack support, each of the axle plates of the front support having an upwardly extending lug at its front end in front of the axle, and an approximately V-shaped bracket having its arms pivoted to the said lugs, the body portion of the bracket being connected with the movable member of the jack.

2. A device of the character specified, comprising front and rear axle supports, each of the said supports consisting of a body adapted to be arranged below the axle in rear thereof and approximately parallel therewith and upwardly extending telescoping arms, means for securing each arm in adjusted position, an axle plate pivoted to the upper end of each of the said arms, a clip for each plate fitting over the axle and detachably connected with the plate, flexible connections between the bodies of the supports, a jack support a rigid connection between the body of the front support and the jack support, a jack comprising a fixed and a movable member, the fixed member being pivoted to the jack support, and a connection between the movable member of the jack and the axle plates of the front support.

3. A device of the character specified, comprising front and rear axle supports, each of the said supports consisting of a body adapted to be arranged below the axle in rear thereof and approximately parallel therewith, upwardly extending telescoping arms, means in connection with each arm for securing the arms in adjusted position, an axle plate pivoted to the upper end of each of the said arms, flexible connections between the bodies of the supports, a jack support in front of the front axle, a rigid detachable connection between the front support and the jack support, and a jack arranged between the axle plates of the front support and the jack support.

4. A device of the character specified, comprising front and rear axle supports, each of the said supports consisting of a body adapted to be arranged below the axle in rear thereof and approximately parallel therewith, upwardly extending telescoping arms, means in connection with each arm for securing the arm in adjusted position, an axle plate pivoted to the upper end of each of the said arms, and flexible connections between the bodies of the supports.

5. A device of the character specified, comprising front and rear axle supports, each of the said supports comprising a body adapted to be arranged in rear of the axle and approximately parallel therewith, and arms, each of the said arms being extensible and contractible and having means for securing the arm in adjusted position, an axle plate pivoted to the upper end of each of the said arms and adapted to engage beneath the axle, means for detachably securing each plate to the axle, a jack support detachably connected with the body of the front support, and a jack arranged between the said jack support and the axle plates of the adjacent support.

6. In a device of the character specified, a plurality of axle supports, each comprising a body and arms extending angularly therefrom, each of the said arms consisting of an outer section integral with the body and an inner section slidable in the outer section, means for securing the sections of each arm in adjusted position, an axle plate pivoted to the inner section of each arm, a clip for engaging the axle detachably connected with the plate, a jack support detachably connected with the front support, and means connected with the axle plates of the front support for engagement by a jack.

7. In a device of the character specified, a plurality of axle supports, each of the said supports being approximately U-shaped, the arms of each support being expansible and contractible, means for securing each arm in adjusted position, an axle plate pivoted to the upper end of each arm, and a clip detachably connected with each plate, a jack support, means for rigidly connecting the jack support to the body of one of the axle supports, and a jack between the support and the axle plates of the said axle support.

8. In combination with a vehicle, a device of the character specified, comprising front and rear axle supports, each of the said supports comprising a body extending approximately parallel with the axle, and arms hinged to the axles, each of the said arms being extensible and contractible and having means for securing the arm in adjusted position, a connection between the bodies of the supports, means on the vehicle for holding the supports in inoperative position, a bracket pivoted to the arms of the front support near the axle, means on the vehicle for holding the bracket in elevated position, a jack support detachably connected with the body of the front support, and a jack for engaging the support, said jack having means for engaging the bracket for the purpose specified.

9. In combination with a vehicle, a device of the character specified, comprising front and rear axle supports, each of the said supports comprising a body extending approximately parallel with the axle, and arms hinged to the axles, a connection between the bodies of the supports, means on the vehicle for holding the supports in inoperative position, a bracket pivoted to the arms of the front support near the axle, means on the vehicle for holding the bracket in elevated position, a jack support detachably connected with the body of the front support, and a jack for engaging the support, said jack having means for engaging the bracket for the purpose specified.

10. In combination with a vehicle, a device of the character specified, comprising front and rear axle supports, each of the said supports comprising a body extending approximately parallel with the axle, and arms hinged to the axles, a connection between the bodies of the supports, means on the vehicle for holding the supports in inoperative position, a bracket pivoted to the arms of the front support near the axle, means on the vehicle for holding the bracket in inoperative position, and a jack support having means for detachably engaging the body of the front support, the jack being adapted to be connected with the bracket.

11. In combination with the vehicle, a device of the character specified, comprising front and rear axle supports, each of the said supports being hinged to the axle to swing into and out of operative position, a flexible connection between the supports, means on the vehicle adjacent to each support for holding the said support in inoperative position, a bracket hinged to the front axle and adapted for connection with a jack, a jack support, a detachable connection between the said jack support and the front axle support, means on the vehicle for holding the bracket in inoperative position, said axle supports being extensible and contractible, and means for securing them in adjusted position.

12. In combination with the vehicle, a device of the character specified, comprising front and rear axle supports, each of the said supports being hinged to the axle to swing into and out of operative position, a flexible connection between the supports, means on the vehicle adjacent to each support for holding the said support in inoperative position, a bracket adapted to be engaged by a jack, said bracket being hinged to the front axle, a jack support, a detachable connection between the said jack support and the front axle support, and means on the vehicle for holding the bracket in inoperative position.

13. In combination with a vehicle, a device of the character specified, comprising front and rear axle supports hinged to the respective axles for swinging movement into and out of operative position, a connection between the supports, means on the vehicle adjacent to each support for holding the said support in inoperative position, a jack support connected to the front axle, and means for detachably connecting the said jack support to the adjacent axle support.

14. In combination with a vehicle, an axle support hinged to each axle for swinging movement into and out of operative position, a connection between the supports, means on the vehicle for holding each of the said supports in inoperative position, a jack support, a detachable connection between the jack support and the front axle support, means connected with the front axle support for engagement by a jack on the jack support, to move the vehicle rearwardly, said means being mounted for swinging movement, and means for holding the said means out of operative position.

JOSEPH DE HAVEN BUNN.

Witnesses:
C. E. TRAINER,
SOLON C. KEMON.